United States Patent
Silbermintz et al.

(10) Patent No.: US 10,409,570 B2
(45) Date of Patent: Sep. 10, 2019

(54) FEEDBACK DIRECTED PROGRAM STACK OPTIMIZATION

(71) Applicant: FREESCALE SEMICONDUCTOR, INC., Austin, TX (US)

(72) Inventors: Michal Silbermintz, Tel Mond (IL); John Russo, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/297,606

(22) Filed: Oct. 19, 2016

(65) Prior Publication Data
US 2018/0107465 A1  Apr. 19, 2018

(51) Int. Cl.
*G06F 8/41* (2018.01)

(52) U.S. Cl.
CPC ............ *G06F 8/4434* (2013.01); *G06F 8/443* (2013.01); *G06F 8/447* (2013.01)

(58) Field of Classification Search
CPC ......... G06F 8/4434; G06F 8/443; G06F 8/447
See application file for complete search history.

(56) References Cited

U.S. PATENT DOCUMENTS

| | | | | |
|---|---|---|---|---|
| 5,828,883 A * | 10/1998 | Hall | ..................... | G06F 11/3409 717/133 |
| 5,946,492 A | 8/1999 | Bates | | |
| 6,044,221 A * | 3/2000 | Gupta | ..................... | G06F 8/443 717/151 |
| 6,195,793 B1 * | 2/2001 | Schmidt | ................ | G06F 8/4443 717/151 |
| 6,434,743 B1 * | 8/2002 | Click, Jr. | ................ | G06F 8/441 717/157 |
| 6,934,935 B1 * | 8/2005 | Bennett | .................. | G06F 11/323 714/E11.181 |
| 6,986,130 B1 * | 1/2006 | Boucher | ............... | G06F 8/4441 717/150 |
| 7,278,137 B1 * | 10/2007 | Fuhler | .................... | G06F 8/4434 717/151 |

(Continued)

OTHER PUBLICATIONS

Peng Zhao et al., "Function outlining and partial inlining," 2005, 17th International Symposium on Computer Architecture and High Performance Computing, pp. 1-8, downloaded from <URL>http://ieeexplore.ieee.org/stamp/stamp.jsp?arnumber=1592562.*

(Continued)

*Primary Examiner* — Thuy Dao
*Assistant Examiner* — Stephen D Berman (57) ABSTRACT

A processing device includes an instruction memory to store executable applications that are executable by a target processor, and a compiler. The compiler includes a builder module and a call graph generator. The builder module to build executable applications for the target processor based on a set of instructions. The call graph generator to create a first call graph that indicates a stack usage for each call path of the executable applications. If a first executable application built by the builder module includes a call path that exceeds a stack size constraint of the target processor, the builder module to optimize only functions within the call path that exceeds the stack size constraint in response to the request from the evaluation monitor, and to build a second executable application based on the set of instructions. The second executable application is optimized for stack memory usage of the target processor.

14 Claims, 4 Drawing Sheets

(56) References Cited

U.S. PATENT DOCUMENTS

| | | | |
|---|---|---|---|
| 8,341,613 B2 | 12/2012 | Donohue et al. | |
| 8,578,347 B1* | 11/2013 | Carrick | G06F 11/3409 717/104 |
| 9,015,689 B2 | 4/2015 | Bai et al. | |
| 9,274,771 B1* | 3/2016 | Kalogeropulos | G06F 8/443 |
| 9,588,872 B2* | 3/2017 | Revanna | G06F 11/3636 |
| 2002/0073406 A1 | 6/2002 | Gove | |
| 2002/0184617 A1* | 12/2002 | Bera | G06F 8/4434 717/140 |
| 2007/0245324 A1* | 10/2007 | Inglis | G06F 8/443 717/140 |
| 2011/0145785 A1* | 6/2011 | Centonze | G06F 8/4434 717/108 |
| 2013/0198498 A1* | 8/2013 | Koju | G06F 9/3005 712/234 |
| 2014/0282454 A1* | 9/2014 | Bai | G06F 8/433 717/157 |
| 2016/0103664 A1* | 4/2016 | Kee | G06F 8/34 717/105 |
| 2017/0123773 A1* | 5/2017 | Gao | G06F 8/443 |

OTHER PUBLICATIONS

Glenn Ammons et al., "Finding and Removing Performance Bottlenecks in Large Systems," 2004 [retrieved on Jan. 5, 2019], ECOOP 2004—Object-Oriented Programming, pp. 172-196, downloaded from the Internet at <url>:htttps://link.springer.com/chapter/10.1007/978-3-540-24851-4_8. (Year: 2004).*

Michael Burke et al., "The Jalapeño dynamic optimizing compiler for Java," 1999 [retrieved on May 10, 2019], Proceedings of the ACM 1999 conference on Java Grande, pp. 129-141, downloaded from <url>:https://dl.acm.org/. (Year: 1999).*

Mary Hall et al., "Efficient call graph analysis," 1992 [retrieved on May 10, 2019], ACM Letters on Programming Languages and Systems (LOPLAS), vol. 1 Issue 3, pp. 227-242, downloaded from <url>:https://dl.acm.org/. (Year: 1992).*

P. P. Chang et al., "Inline function expansion for compiling C programs," 1989 [retrieved on May 10, 2019], Proceedings of the ACM SIGPLAN 1989 conference on Programming language design and implementation, pp. 246-257, downloaded from <url>:https://dl.acm.org/. (Year: 1989).*

* cited by examiner

FEEDBACK DIRECTED PROGRAM STACK OPTIMIZATION

FIELD OF THE DISCLOSURE

This disclosure generally relates to data processing and in particular to using feedback for directed program stack optimization.

BACKGROUND

A program stack is a memory location used to temporarily store data for use by a particular microprocessor, referred to as the target processor of the stack. For example, a stack's target processor, such as microprocessor embedded in a microcontroller, can store and retrieve data from the stack for a program that it is executing. However, the memory available to implement a stack for such a target processor can be limited to a relatively small size, especially in single chip microcontrollers having many integrated features. To reduce the needed stack size, software programmers take active measures including: de-featuring functionality; avoiding deep call stacks; minimizing data sizes; re-using local variables; and the like. However, these measures often come at a cost. For example, these measures can compromise the product's robustness, violate code modularity, reduce code read-ability and often introduce error-prone constructs. Therefore, if a measure taken to optimize use of a small program stack is applied unnecessarily, e.g., the measure could be supported by the available stack size, the reduction in the stack size can result in the associated program and thus the target processor having reduced functionality. Thus, a determination of how to optimize the program can be adaptively used to reduce the effect on the functionality of the target processor.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A compiler processing device adaptively determines whether to optimize an executable application based on analysis of a current stack size of the executable application. The compiler processing device builds an executable application to be executed by a target processor device. A call graph generator of the compiler then generates an annotated call graph for the executable application, which can be utilized to determine stack memory usage for each of the call paths in the executable application. As used herein, an annotated call graph is a call graph that includes information about the stack use for each function in the call graph. Based on the call graph, the compiler determines whether the stack memory usage of one or more call paths in the executable application exceeds a stack size constraint for the target processor. If so, the compiler re-builds the executable application using additional measures to reduce stack size to create an executable application that has a reduced stack size in the one or more call paths that had exceeded the stack size constraint. The call graph generator can then generate an annotated call graph for the re-built executable application. The compiler can determine whether any call paths for the re-built executable application exceeds the stack size constraint. If not, the compiler can store the executable application in a memory for the target processor.

Figure 1:
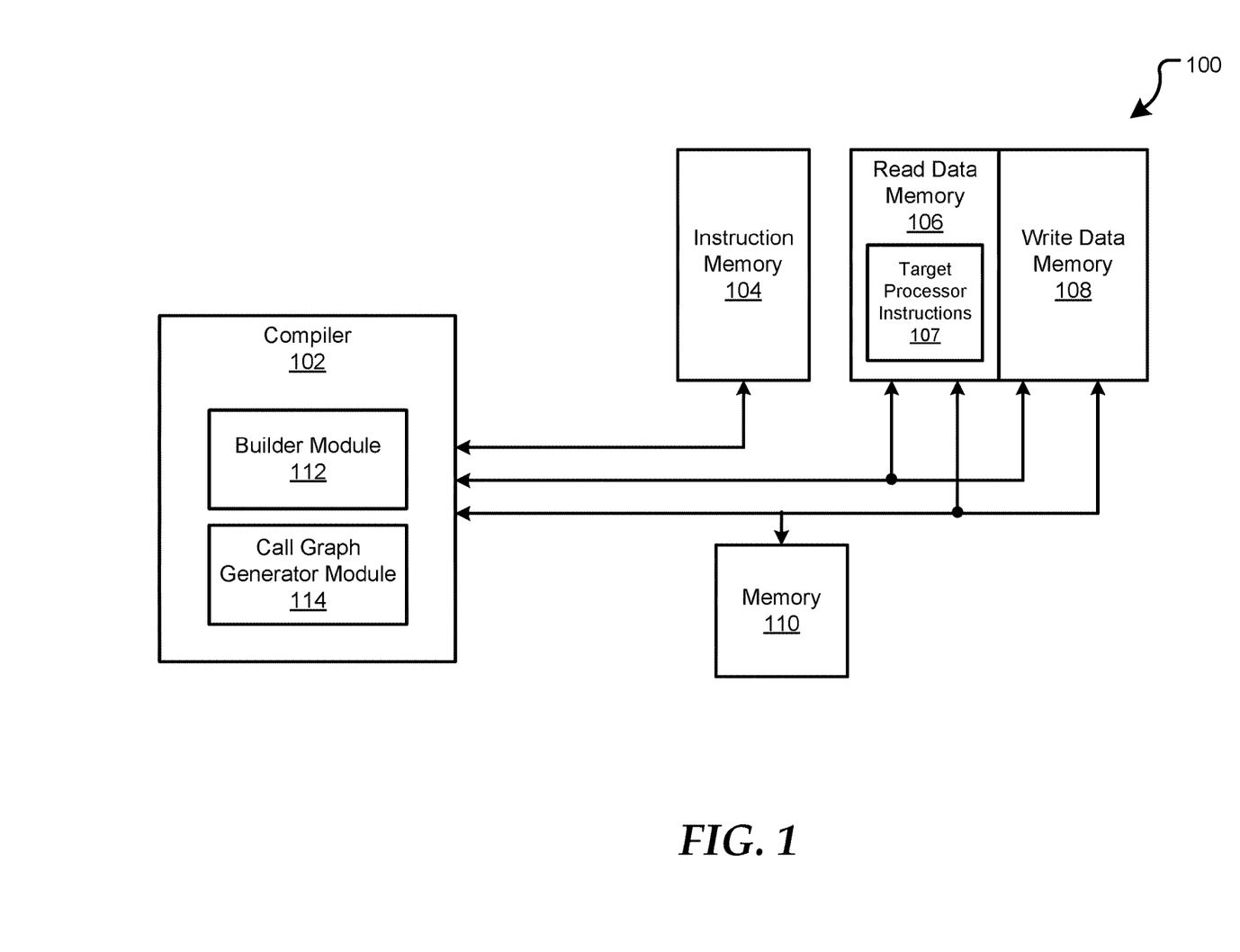
FIG. 1 illustrates a portion of a processor subsystem in accordance with at least one embodiment of the present disclosure.

FIG. 1 illustrates a portion of a processor subsystem 100 in accordance with at least one embodiment of the present disclosure. The processor subsystem 100 includes a compiler 102, an instruction memory 104, a read data memory 106, a write data memory 108, and other memory 110. The compiler 102 is typically implemented by a data processor executing code from an instruction memory, such as from instruction memory 104, and includes a builder module 112, a call graph generator 114, and an evaluation monitor 116. In an embodiment, the builder module 112, the call graph generator 114, and the evaluation monitor 116 can represent hardware components of the processor that include an instruction based processor and memory storing specific instruction code stored at memory 104, a non-instruction based state machine, and the like.

During operation, the compiler 102 operates to compile and link instructions from the instruction memory 104 for a target processor (not shown). The compiler 102 can then store the target processor's compiled instructions at memory portion 107. The target processor can then retrieve the compiled instructions from the memory portion 107 for execution. During the compiling and linking of the instructions, the compiler can determine whether to optimize the instructions based on the stack memory usage of the compiled instructions. In an embodiment, the compiler 102 can also retrieve application source files, library source files, and a stack size constraint for the target processor along with the set of instructions. The builder module 112 of the compiler 102 can build an executable application for the target processor from the set of instructions, the application source files, and the library source files.

When the builder module 112 has completed the executable application, the call graph generator 114 can receive the executable application and create an annotated call graph for the executable application. An example program or executable application can be:

```
main( ) {
    a(...);
}
a(...)
{
    b(...);
    c(...);
    d(...);
}
b(...)
{
    e(...);
}
c(...)
```

```
{
    e(...);
    h(...);
}
d(...)
{
    f(...);
}
f( )
{
    g(...);
}
```

Figure 2:
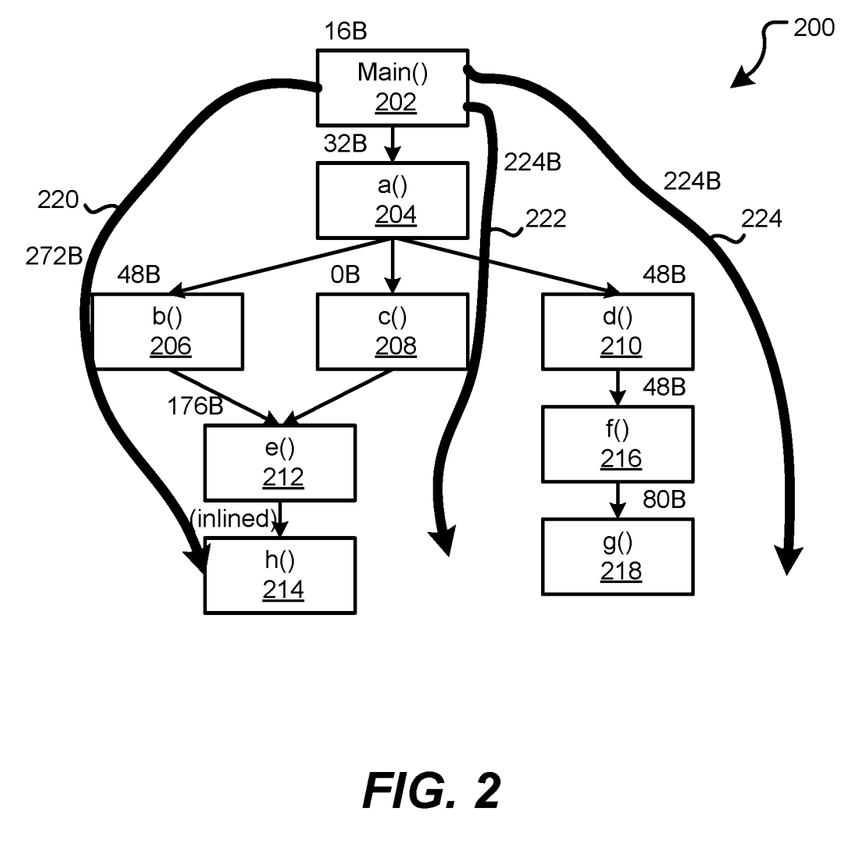
FIG. 2 illustrates an annotated call graph for a first iteration of an executable application compiled within the processor subsystem of FIG. 1 in accordance with at least one embodiment of the present disclosure.

The call graph generator 114 can create an annotated call graph 200 for the exemplary program above as shown in FIG. 2.

FIG. 2 illustrates an annotated call graph 200 for a first iteration of an executable application compiled within the processor subsystem 100 in accordance with at least one embodiment of the present disclosure. In an embodiment, the annotated call graph 200 can be stored in memory 110 and can be provided to the compiler 102 as needed. The annotated call graph 200 includes a block for each function in the program: main block 202, function a( ) block 204, function b( ) block 206, function c( ) block 208, function d( ) block 210, function e( ) block 212, function h( ) block 214, function f( ) block 216, and function go block 218 (function blocks 202-218). The annotated call graph 200 also includes an indication of the amount of stack memory used by each function. As illustrated, the number of bytes of stack memory is indicated at the edge each box. For example, main block 202 utilizes 16 bytes, function a( ) block 204 utilizes 32 bytes, function b( ) block 206 utilizes 48 bytes, function c( ) block 208 utilizes 0 bytes, function d( ) block 210 utilizes 48 bytes, function e( ) block 212 utilizes 176 bytes, function f( ) block 216 utilizes 48 bytes, and function go block 218 utilizes 80 bytes. In this example, because function h( ) is completely in-lined within function e( ) the stack usage of function h( ) is included with the stack usage of function e( ) and function h( ) is shown to have a stack size of zero.

In addition, FIG. 2 illustrates three call paths through the call graph. Call path 220 flows through functions Main( ) a( ) b( ), e( ) and h( ). Call path 222 flows through functions Main( ) a( ) c( ) e( ) and h( ). Call path 224 flows through functions Main( ) a( ) d( ), f( ) and g( ).

The call graph generator 114 can also generate a stack estimation output for the program. This stack estimation output can include the stack size constraint for the target processor, the stack memory usage for each function, the stack memory usage for a function and all functions called within that function, and the stack memory remaining. In an embodiment, a function that is called within that function is a child of that function. A stack estimation output for the program shown in the annotated call graph 200 is provided below:

| Initial Stack Size Constraint: 256 bytes | |
|---|---|
| main: | <16> <272> <−16> |
| a: | <32> <256> <−16> |
| b: | <48> <224> <−16> |
| e: | <176> <176> <−16> |
| c: | <0> <176> <32> |
| e: | <176> <176> <32> |
| d: | <48> <176> <32> |

| Initial Stack Size Constraint: 256 bytes | |
|---|---|
| f: | <48> <128> <32> |
| g: | <80> <80> <32 |

In the stack estimation output above, the first line indicates the stack size constraint of the specific target processor, which 256 bytes. This number indicates that the stack memory usage of each call path through the annotated call graph needs to be less than or equal to 256 bytes. Each subsequent line corresponds to a particular function. The first number of each subsequent line indicates the number of bytes used by the indicated function. The second number following a particular function is the largest stack size needed for the indicated function, and its children, e.g., all possible flow paths beginning at the indicated function. The third number indicates the difference between the needed stack size and the available stack size.

As shown in the stack estimation output above, at least one of the call paths 220, 222, and 224 from main exceeds the stack size constraint for the target processor. This is determined by the data in the annotated call graph 200 and the stack estimation output above. Thus, the stack estimation output for the function main, "main: <16><272><−16>", indicates the function uses 16 bytes of stack memory, that main and that the largest stack size needed, based upon its children, is 272 bytes, and that the stack memory usage for main and its children has exceeded the stack size constraint by 16 bytes. Based on this information, the compiler 102 can utilize the call graph to detect that at least one call path in the executable program has exceeded the stack size constraint for the target processor. For example, the compiler 102 can utilize the annotated call graph 200 to detect that the total stack memory usage for call path 220 is 272 bytes. Thus, the compiler 102 can determine that the instructions associated with call path 220 should be optimized for stack size.

The compiler 102 can then detect whether the call path 222, which includes main→a( )→c( )→e( ) exceeds the stack size constraint for the target processor. The compiler 102 can utilize the annotated call graph 200 to detect that the total stack memory usage for call path 222 is 224 bytes. Thus, the compiler 102 can detect that the instructions associated with call path 224 do not need to be optimized for stack size. The compiler 102 can then detect whether the call path 224, which includes main→a( )→d( )→f( )→g( ), exceeds the stack size constraint for the target processor. The compiler 102 detect that the instructions associated with call path 224 do not need to be optimized for stack size, based on the total stack memory usage for call path 224 being 224 bytes. Therefore, the compiler 102 can set the instructions for call path 220 to be optimized and the other instructions in the program to be left alone.

The builder module 112 can then re-build an executable program for the target processor with optimized instructions for the call path 220. The builder module 112 can optimize the instructions in call path 220 for stack size using one or more of the following optimization techniques: selective in-lining and outlining, stack placement algorithms to minimize alignment padding, register allocation algorithm selection, instruction selection to minimize resource usage, data analysis to allocate variables to static memory (instead of stack), or the like. In an embodiment, the builder module 112 can utilize the optimization techniques in an iterative process. For example, the builder module 112 can first utilize selective in-lining and outlining and a determination can be made whether the stack size of the call path is below the stack size constraint. If so, the builder module 112 can end the optimization process, otherwise the builder module 112 can utilize the next optimization technique (e.g., stack placement algorithms to minimize alignment padding). The builder module 112 can then continue this iterative process until the stack size of the call path is below the stack size constraint or all of the optimization techniques have been utilized. In an embodiment, if all of the optimization techniques have been tried and the stack size of the call path is still above the stack size constraint, the builder module 112 can then try different combination of two optimization techniques in an iterative process until either the stack size of the call path is below the stack size constraint or all of the combination have been tried.

The compiler 102 can reduce stack memory usage by either in-lining a function or by inhibiting in-lining. In-lining of a function can eliminate one or more explicit function call by implementing functions using in-line code, instead of using function calls. For example, the stack memory usage may be reduced by enabling in-lining, because eliminating a called function eliminates the necessity of saving the machine state, such as non-volatile registers, on the stack. Alternatively, stack usage may be reduced by inhibiting in-lining, e.g., enabling an explicit call instruction for the called function, because an explicit called function may reduce register pressure in the caller, which in turn reduces spill code which uses stack space.

The compiler 102 can also utilize stack placement algorithms to minimize alignment padding and therefore reduce the stack usage. A programmable computing machine must adhere to certain rules that are defined by the processor's architectural application binary interface (ABI) about where automatic variable objects are placed/stored on the stack. Additionally, the address alignment of the automatic variables can also be defined by the ABI. However, in some cases these rules cause inefficient use of stack space. For example, given two aligned structures, e.g., aggregate objects, and several scalar objects, e.g., non-aggregate objects, sharing stack space, an ABI compliant stack layout may be modified to pack objects such that stack usage is reduced. In an embodiment, the packing of the objects can be used to store the objects in locations that were previous designated as padding or spacing locations in the stack. Therefore, by replacing the padding portions of the stack with the objects the stack size of the program can be reduced.

Another way the compiler 102 can reduce the stack usage is by utilizing register allocation algorithm selection. Register allocation is the assignment of physical register resources to program variables and compiler generated temporary variables. At any one time in a program, any number of variables may be 'live', meaning they have a value that will be used in a subsequent calculation. Thus, live variables must have ownership of the register resource to which they are assigned until the variable is no longer needed. When the number of live variables exceeds the number of physical register resources to which they can be assigned, some of the variables are copied into stack memory to preserve the values of these variables. The variables also give up their register ownership, such that another variable can get ownership of that register. Later when the value of the variable that was copied to the stack memory is needed in the program, the value can be copied from stack memory to an available register.

The compiler 102 can choose between several algorithms or heuristics to do register allocation. However, it is impractical in terms of computing time for the compiler 102 try multiple allocation schemes for all functions in a program. Instead, the compiler 102 can utilize the calculated a stack memory usage in the annotated call graph 200 to determine which functions to try multiple allocation schemes. In an embodiment, the functions that have the largest stack memory usage can be the functions that the compiler 102 can try the multiple allocation schemes. After the compiler 102 tries multiple schemes for the identified functions, the compiler 102 can choose the allocation scheme which results in a minimum number of variables that need to copied to the stack memory and thus minimize the stack usage for the call graph.

Another stack memory reduction scheme that can be utilized by the compiler 102 during the re-build of an executable application is to use data analysis to allocate variables to static memory instead of stack. The compiler 102 can use the stack usage in the annotated call graph 200 to choose local variables that use an excessive amount of stack space and can change that variable to use static memory.

Figure 3:
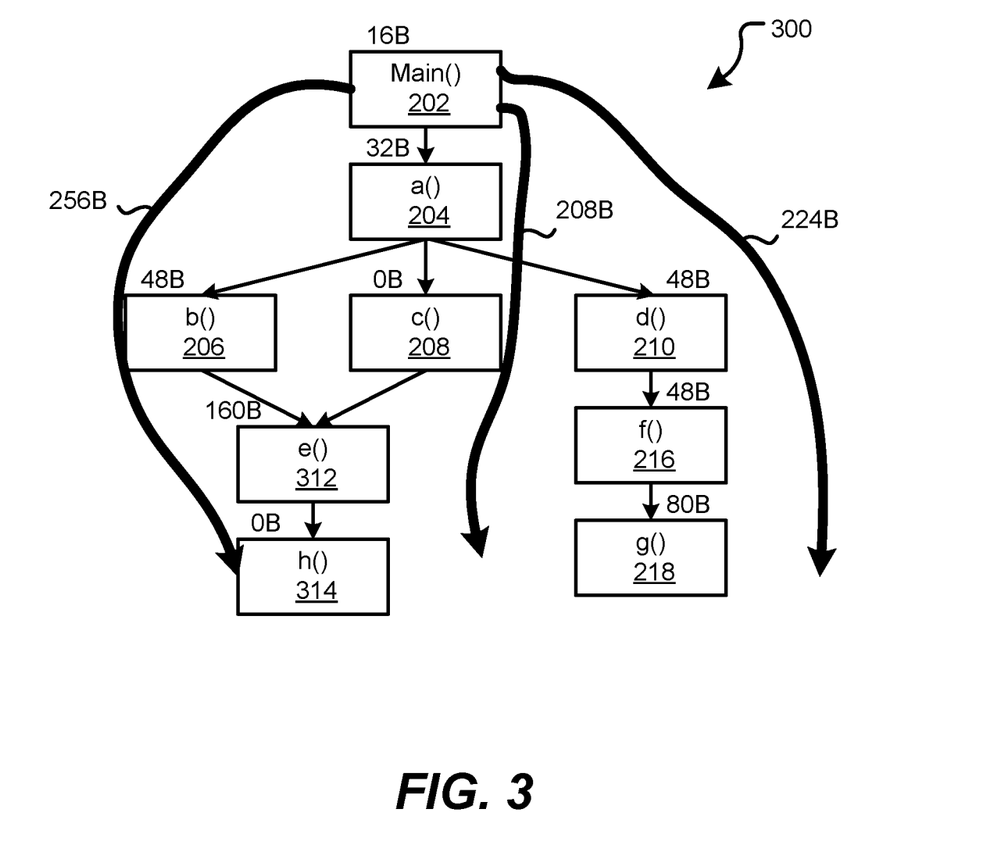
FIG. 3 illustrates an annotated call graph for a second iteration of the executable application in accordance with at least one embodiment of the present disclosure.

Thus, the compiler 102 can utilize one or more of the above optimization schemes to reduce the largest stack memory usage function in the call path 220 that exceeds the stack size constraint for the target processor. For example, the compiler 102 can inhibit in-lining of function h( ) within function e( ). The call graph generator 114 can then create a new annotated call graph 300 for the re-built executable application.

FIG. 3 illustrates an annotated call graph 300 for a second iteration of an executable application compiled within the processor subsystem 100 in accordance with at least one embodiment of the present disclosure. The annotated call graph 300 includes a block for each function in the program: main block 202, function a( ) block 204, function b( ) block 206, function c( ) block 208, function d( ) block 210, function e( ) block 312, function h( ) block 314, function f( ) block 216, and function go block 218 (function blocks 202-218). As stated above, the compiler 102 can optimize function e( ) by inhibiting function h( ) from being in-lined within function e( ) but the other functions within re-built executable application can remain the same. Thus, the annotated call graph 300 only stack memory usage for functions e( ) and h( ) is optimized. Function e( ) block 312 utilizes 160 bytes and function h( ) block 314 utilizes 0 bytes.

The call graph generator 114 can also generate a stack estimation output for the re-built executable program. The stack estimation output for the re-built program shown in the annotated call graph 300 is provided below:

| Initial Stack Size Constraint: 256 bytes | |
|---|---|
| main: | <16> <256> <0> |
| a: | <32> <240> <0> |
| b: | <48> <208> <0> |
| e: | <160> <160> <0> |
| h: | <0> <0> <0> |
| c: | <0> <160> <48> |
| e: | <160> <160> <48> |
| h: | <0> <0> <48> |
| d: | <48> <176> <32> |
| f: | <48> <128> <32> |
| g: | <80> <80> <32> |

Thus, the stack estimation output includes "main: <16><256><0>", which provides that the function main uses 16 bytes of stack memory, that main and all of its children use 256 bytes, and that the stack memory usage is equal to the stack size constraint as shown in by the 0 bytes. Therefore, the compiler 102 can utilize the annotated call graphs 200 and 300 to detect the particular functions with an executable application to optimize for stack memory usage, and thereby generate an executable application that has a stack memory usage that is equal to or less than the stack size constraint of a target processor.

Figure 4:
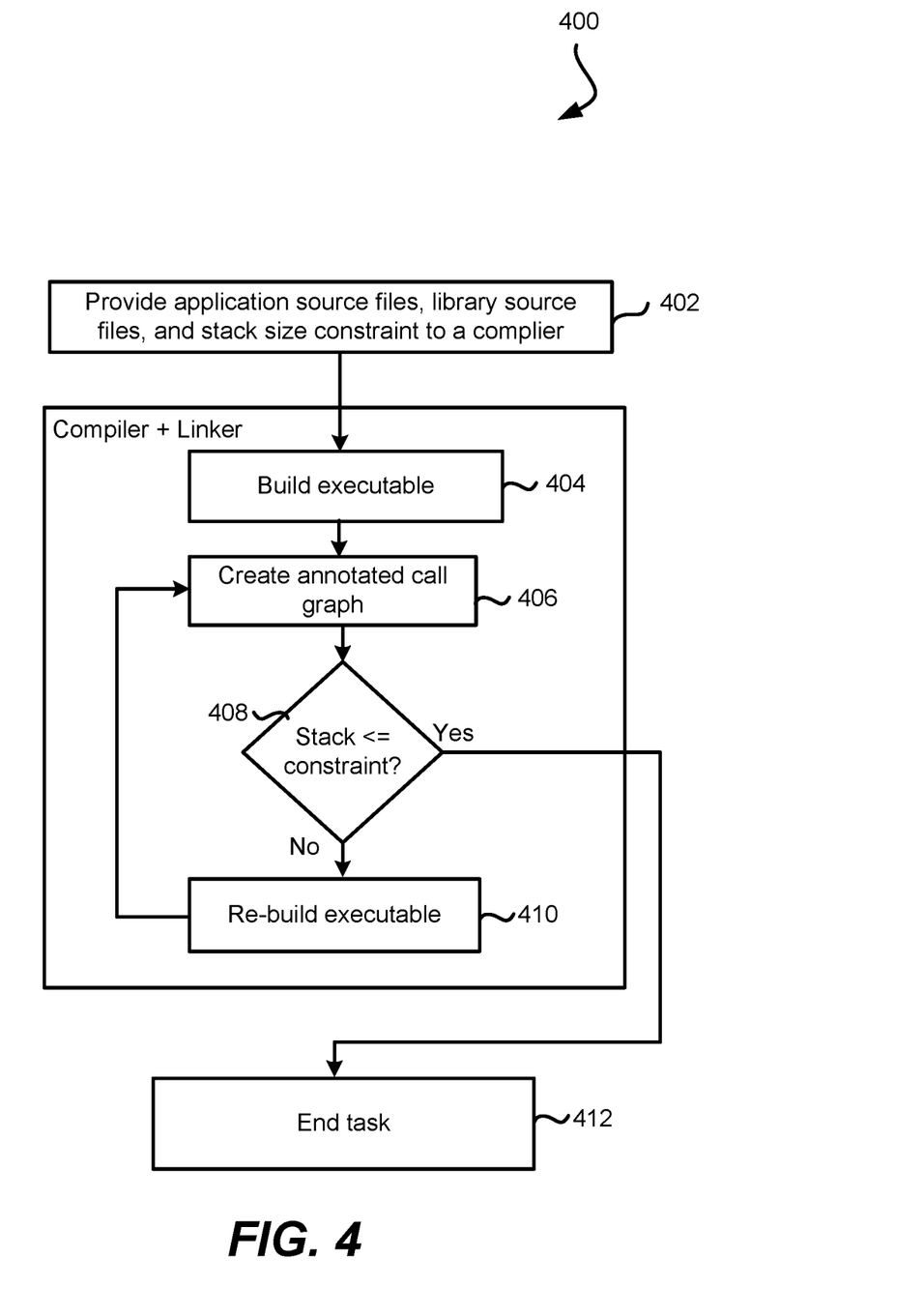
FIG. 4 illustrates a flow diagram of a method for optimizing stack size in an executable application in accordance with at least one embodiment of the present disclosure.

FIG. 4 illustrates a flow diagram of a method 400 for optimizing stack size in an executable application in accordance with at least one embodiment of the present disclosure. At block 402, application source files, library source files, and a stack size constraint is provided to a compiler. In an embodiment, the compiler can be the 102 executing in the data processor system 100 of FIG. 1. In an embodiment, the application source files, the library source files, and the stack size constraint can be stored in a memory prior to being provided to the compiler.

At block 404, an executable application is built. In an embodiment, the builder module 112 of FIG. 1 can build the executable application. A call graph of the application is created at block 406. In an embodiment, the call graph can be created by the call graph generator 114 of FIG. 1. In an embodiment, the call graph can include the stack memory usage by each function of the executable application. At block 408, a determination is made whether the stack memory usage for each path in the executable application is less than or equal to the stack size constraint. In an embodiment, the stack memory usage for each path in the executable application can be calculated using the call graph. For example, the compiler can calculate a total stack memory usage for a function and all of its children in a particular path based on the call graph.

If the stack size of any particular path is not less than or equal to the stack size constraint, the program is re-built by applying program stack optimizations only on paths in which the stack size has exceeded the stack size constraint at block 410 and the flow continues as stated above at block 406. In an embodiment, the optimization of these paths can only be enough to meet stack size constraint. If the stack size of all of the paths are less than or equal to the stack size constraint, the compiler task for the program is ended at block 412.

According to an aspect, a method is disclosed in accordance with at least one embodiment of the present disclosure. The method includes building, by a builder module of a compiler, a first executable application that is executable by a target processor based on a set of instructions. The method also includes creating, by a call graph generator of the compiler, a first call graph for the first executable application, the first call graph comprises a stack memory usage for each function and each child of the function in the first executable application. The method further includes comparing a stack size of a first call path in the first call graph of the first executable application to a stack size constraint of the target processor to determine the first call path exceeds a stack size constraint. The method also includes building a second executable application based on the set of instructions wherein building the second executable application implements a first stack optimization technique in response to the first call path exceeding the stack size constraint. The method further includes optimizing, in the second executable application, only functions within the first call path that exceeds the stack size constraint in response to the first call path exceeding the stack size constraint.

In an embodiment, the method also includes creating, by the call graph generator, a second call graph for the second executable application. In this embodiment, the second call graph differs from the first call graph only with respect to functions that are optimized for the stack memory usage. In an embodiment, the method further includes providing, by the call graph generator, a stack estimation output, wherein the stack estimation output comprises a stack memory usage for a function and each child of the function in the first call path, and a remaining amount of stack memory size for the first call path.

In an embodiment, the first call graph comprises a stack memory usage for each function in the first executable application. In an embodiment, the method also includes storing the optimized second executable application in a memory for the target processor. In an embodiment, a function in the second executable application is optimized as compared to the same function in the first executable application using an optimization technique selected from a group consisting of: selective in-lining and outlining; stack placement algorithms to minimize alignment padding; register allocation algorithm selection; instruction selection to minimize resource usage; and data analysis to allocate variables to static memory.

According to another aspect, a processing device is disclosed in accordance with at least one embodiment of the present disclosure. The processing device includes an instruction memory to store executable applications that are executable by a target processor. The processing device also includes a compiler, which includes a builder module to build executable applications for the target processor based on a set of instructions, a call graph generator to create a first call graph to indicate a stack usage for each call path of the executable applications, and an evaluation monitor. The evaluation monitor is configured to determine if a first executable application built by the builder module comprises a call path that exceeds a stack size constraint of the target processor. The evaluation monitor is also configured to request the builder module to build a second executable application based on the set of instructions in response to the call path exceeding the stack size constraint. The builder module to optimize only functions within the call path that exceeds the stack size constraint in response to the request from the evaluation monitor.

In an embodiment, the processing device further includes a memory configured to store the optimized second executable application for the target processor. In an embodiment, the call graph generator further to create a second call graph for the second executable. In an embodiment, the second call graph differs from the first call graph only with respect to functions that are optimized for the stack memory usage.

In an embodiment, the call graph generator further to provide a stack estimation output, wherein the stack estimation output comprises a stack memory usage for a function and each child of the function in a call path, and a remaining amount of stack memory size for the call path. In an embodiment, the first call graph comprises a stack memory usage for each function is the first executable application. In an embodiment, a function in the second executable application is optimized as compared to the same function in the first executable application using an optimization technique selected from a group consisting of: selective in-lining and outlining; stack placement algorithms to minimize alignment padding; register allocation algorithm selection; instruction selection to minimize resource usage; and data analysis to allocate variables to static memory.

According to another aspect, a method is disclosed in accordance with at least one embodiment of the present disclosure. The method includes building, by a builder module of a compiler, a first executable application that is executable by a target processor based on a set of instructions. The method also includes creating, by a call graph generator of the compiler, a first call graph for the first executable application, the first call graph comprises a stack memory usage for each function and each child of the function in the first executable application. The method further includes determining whether any call paths in the first call graph of the first executable application has a stack size that exceeds a stack size constraint of the target processor. The method also includes that if a plurality of stack sizes associated with a plurality of call paths of the first executable application in the first call graph exceed the stack size constraint of the target processor, building a second executable application based on the set of instructions, wherein only functions within the plurality of call paths that have the stack sizes that exceed the stack size constraint of the first executable application are optimized for stack memory usage in the re-built second executable application.

In an embodiment, the method also includes creating, by the call graph generator, a second call graph for the second executable application. In this embodiment, the second call graph differs from the first call graph only with respect to functions that are optimized for the stack memory usage. In an embodiment, the method also includes providing, the call graph generator, a stack estimation output, wherein the stack estimation output comprises a stack memory usage for a function and each child of the function in a call path, and a remaining amount of stack memory size for the call path. In an embodiment, the first call graph comprises a stack memory usage for each function in the first executable application. In an embodiment, a function in the second executable application is optimized as compared to the same function in the first executable application using an optimization technique selected from a group consisting of: selective in-lining and outlining; stack placement algorithms to minimize alignment padding; register allocation algorithm selection; instruction selection to minimize resource usage; and data analysis to allocate variables to static memory.

According to another aspect, a method is disclosed in accordance with at least one embodiment of the present disclosure. The method includes building, by a builder module of a compiler, a first executable application that is executable by a target processor based on a set of instructions. The method also includes creating, by a call graph generator of the compiler, a first call graph for the first executable application, the first call graph includes a stack memory usage for each function and each child of the function in the first executable application. The method further includes comparing a stack size of a first call path of the first executable application to a stack size constraint of the target processor to determine the first call path exceeds a stack size constraint. The method also includes building a second executable application based on the set of instructions wherein building the second executable application implements a first stack optimization technique to optimize a function in the first call path that exceeds the stack size constraint in response to the first call path exceeding the stack size constraint.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof. For example, one skilled in the art would appreciate that a data processing system, such as a computer having an instruction based data processor, can be used to implement the analysis described herein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
    building, by a builder module of a compiler, a first executable application that is executable by a target processor based on a set of instructions;
    creating, by a call graph generator of the compiler, a first call graph for the first executable application, the first call graph comprises a stack memory usage for each function and each child of the function in the first executable application;
    comparing a stack size of a first call path in the first call graph of the first executable application to a stack size constraint of the target processor to determine the first call path exceeds the stack size constraint;
    comparing a stack size of a second call path in the first call graph of the first executable application to the stack size constraint of the target processor to determine the second call path is within the stack size constraint;
    selecting a first stack optimization technique in response to determining that the first call path exceeds the stack size constraint;
    building a second executable application based on the set of instructions wherein building the second executable application implements the selected first stack optimization technique in response to the first call path exceeding the stack size constraint;
    creating, by the call path generator, a second call graph for the second executable application;
    comparing a stack size of a first call path in the second call graph of the second executable application to the stack size constraint of the target processor to determine whether the first call path in the second call graph of the second executable application exceeds the stack size constraint;
    optimizing, in the second executable application, only functions within the first call path in the second call graph that exceed the stack size constraint in response to the first call path in the second call graph exceeding the stack size constraint and the second call path being within the stack size constraint;

selecting a second stack optimization technique when the first call path in the second call graph of the second executable application exceeds the stack size constraint;

building a third executable application based on the set of instructions wherein building the third executable application implements the selected second stack optimization; and creating, by the call path generator, a third call graph for the third executable application.

2. The method of claim 1, wherein the second call graph differs from the first call graph only with respect to functions that are optimized for the stack memory usage.

3. The method of claim 1, further comprising:
providing, by the call graph generator, a stack estimation output, wherein the stack estimation output comprises a stack memory usage for a function and each child of the function in the first call path, and a remaining amount of stack memory size for the first call path.

4. The method of claim 1, further comprising:
storing the optimized second executable application in a memory for the target processor.

5. The method of claim 1, wherein a function in the second executable application is optimized as compared to the same function in the first executable application using an optimization technique selected from a group consisting of: selective in-lining and outlining; stack placement algorithms to minimize alignment padding; register allocation algorithm selection; instruction selection to minimize resource usage; and data analysis to allocate variables to static memory.

6. A processing device comprising:
an instruction memory to store executable applications that are executable by a target processor; and
a compiler including:
a builder module;
a call graph generator; and
an evaluation monitor;
wherein the compiler is configured to:
build, by the builder module, a first executable application that is executable by the target processor based on a set of instructions;
create, by the call graph generator, a first call graph for the first executable application, the first call graph comprises a stack memory usage for each function and each child of the function in the first executable application;
compare, by the evaluation monitor, a stack size of a first call path in the first call graph of the first executable application to a stack site constraint of the target processor to determine the first call path exceeds the stack size constraint;
compare a stack size of a second call path in the first call graph of the first executable application to the stack size constraint of the target processor to determine the second call path is within the stack size constraint;
select a first stack optimization technique in response to determining that the first call path exceeds the stack size constraint;
build a second executable application based on the set of instructions wherein building the second executable application implements the selected first stack optimization technique in response to the first call path exceeding the stack size constraint;

create, by the call path generator, a second call graph for the second executable application;

compare a stack size of a first call path in the second call graph of the second executable application to the stack size constraint of the target processor to determine whether the first call path in the second call graph of the second executable application exceeds the stack size constraint;

optimize, in the second executable application, only functions within the first call path in the second call graph that exceed the stack size constraint in response to the first call path in the second call graph exceeding the stack size constraint and the second call path being within the stack size constraint;

select a second stack optimization technique when the first call path in the second call graph of the second executable application exceeds the stack size constraint;

build a third executable application based on the set of instructions wherein building the third executable application implements the selected second stack optimization; and create, by the call path generator, a third call graph for the third executable application.

7. The processing device of claim 6, further comprising:
a memory configured to store the optimized second executable application for the target processor.

8. The processing device of claim 7, wherein the second call graph differs from the first call graph only with respect to functions that are optimized for the stack memory usage.

9. The processing device of claim 6, the call graph generator further to provide a stack estimation output, wherein the stack estimation output comprises a stack memory usage for a function and each child of the function in a call path, and a remaining amount of stack memory size for the call path.

10. The processing device of claim 6, wherein a function in the second executable application is optimized as compared to the same function in the first executable application using an optimization technique selected from a group consisting of: selective in-lining and outlining; stack placement algorithms to minimize alignment padding; register allocation algorithm selection; instruction selection to minimize resource usage; and data analysis to allocate variables to static memory.

11. The method of claim 1, further comprising:
comparing a stack size of the first call path in the third call graph of the third executable application to the stack size constraint of the target processor to determine whether the first call path exceeds the stack size constraint; and
optimizing, in the third executable application, only functions within the first call path in the third call graph that exceed the stack size constraint when the first call path in the third call graph exceeds the stack size constraint.

12. The method of claim 11, further comprising:
selecting the first and second stack optimization techniques when the first call path in the third call graph exceeds the stack size constraint;
building a fourth executable application based on the set of instructions wherein building the fourth executable application implements a combination of the the selected first and second stack optimization techniques when the first call path in the third call graph exceeds the stack size constraint; and creating, by the call path generator, a fourth call graph for the fourth executable application.

13. The processing device of claim 6, wherein the compiler is further configured to:
  compare a stack size of the first call path in the third call graph of the third executable application to the stack size constraint of the target processor to determine whether the first call path exceeds the stack size constraint; and
  optimize, in the third executable application, only functions within the first call path in the third call graph that exceed the stack size constraint when the first call path in the third call graph exceeds the stack size constraint.

14. The processing device of claim 6, wherein the compiler is further configured to:
  select the first and second stack optimization techniques when the first call path in the third call graph exceeds the stack size constraint;
  build a fourth executable application based on the set of instructions wherein building the fourth executable application implements a combination of the the selected first and second stack optimization techniques when the first call path in the third call graph exceeds the stack size constraint; and
  create a fourth call graph for the fourth executable application.

* * * * *